Oct. 3 1967 R. R. ROVER, JR 3,345,632

RUNWAY IMAGE GENERATING APPARATUS

Filed June 12, 1964 6 Sheets-Sheet 1

INVENTOR.
RALPH R. ROVER JR.
BY S. C. Yeaton
ATTORNEY

RUNWAY IMAGE GENERATING APPARATUS

Filed June 12, 1964 6 Sheets-Sheet 2

$$\tan A = \frac{Q}{R'} = \frac{Q}{\frac{h}{\tan\gamma_0}} = \frac{Q\tan\gamma_0}{h} = \frac{(L+R'+\delta L)\tan D\tan\gamma_0}{h} = \frac{\left(L+\frac{h}{\tan\gamma_0}+\delta L\right)\tan D\tan\gamma_0}{h}$$

$$\therefore A \cong \frac{(L+\delta L)\gamma_0 D}{h} + D$$

INVENTOR.
RALPH R. ROVER JR.
BY S. C. Yeaton
ATTORNEY

INVENTOR.
RALPH R. ROVER JR.
BY
S. C. Yeaton
ATTORNEY

INVENTOR.
RALPH R. ROVER JR.
BY S. C. Yeaton
ATTORNEY

Oct. 3 1967 R. R. ROVER, JR 3,345,632

RUNWAY IMAGE GENERATING APPARATUS

Filed June 12, 1964 6 Sheets-Sheet 5

INVENTOR.
RALPH R. ROVER JR.
BY S. C. Yeaton
ATTORNEY

INVENTOR.
RALPH R. ROVER JR
BY S. C. Yeaton
ATTORNEY 3,345,632
RUNWAY IMAGE GENERATING APPARATUS
Ralph R. Rover, Jr., Cresskill, N.J., assignor to Sperry Rand Corporation, Great Neck, N.Y., a corporation of Delaware
Filed June 12, 1964, Ser. No. 374,717
4 Claims. (Cl. 343—108)

Figure 1A:
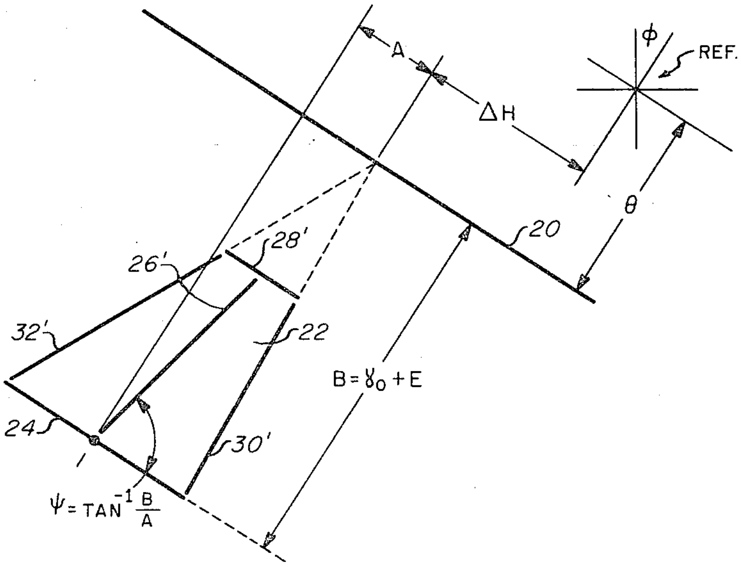

This invention relates in general to aircraft control apparatus and in particular relates to apparatus for providing an image representative of a real world runway in size, shape, and orientation. As such, the invention improves on the nature of both the runway image forms (taken singularly and together) provided by the apparatus of copending applications S.N. 164,769 and S.N. 240,836, now U.S. Patents 3,237,193 and 3,242,493 respectively, both of which are assigned to the present assignee, doing so in a manner which permits a simpler circuit arrangement than that previously employed by the apparatus of either of the aforesaid copending applications.

A presently preferred form of runway image as provided by apparatus embodying the present invention is that of an inverted Latin cross bounded by a four-sided figure, the longer of the two crossing bars of the cross being representative of a runway center line, and the point of intersection of such bars being an aim point toward which the craft is controlled to land. The shorter of the two crossing bars is deemed a runway threshold marker since it indicates the start of the portion of the runway which is actually used for landing purposes. In making the present invention, various equations were set forth for computing sizes and orientations for the lines which go to make up the desired runway image configuration. By making suitable simplifications where possible, certain equations in respective pairs of apparently unrelated equations were noted to be of the same form, being each dependent on but a single variable and each equation of each pair of equations being different from its related equation by a mere constant value. Hence, with the invention, a single function generator such as a single shaped potentiometer may expediently be used for computation of a pair of equations.

Since the present invention is basically an improvement on the runway image producing techniques of both the aforementioned copending applications, many of the terms, techniques and quantities which are common to all of the applications in question are repeated and employed here, whereby the description is greatly facilitated. Also, though the invention in its preferred form provides an image that is an inverted Latin cross configuration bounded by a four-sided figure, it will be realized from the following description that different lines of such an image may be eliminated, whereby either the image described in copending application S.N. 164,769 or the image of application S.N. 240,836 may be provided. As a corollary to this then, note should also be made that were only one of these prior art images ever to be desired, the extent of the apparatus needed would be substantially less when practicing the invention than when either disclosed prior art system is employed.

A principal object of the invention is to provide improved runway image producing apparatus.

Another object of the invention is to provide apparatus for defining an improved form of runway image.

Another form of the invention is to provide runway image defining apparatus that is less costly than equivalent prior art systems for providing similar images.

Another object of the invention is to provide runway image defining apparatus that varies the location of said image on a cathode ray tube in proportion to the magnitude of either or both an Instrument Landing System glide slope receiver output signal or a localizer receiver output signal, but does not vary the size of said image in proportion to those signals.

Another object of the invention is to provide low cost runway image producing apparatus that uses a single computing component for production of two distinct and different cathode ray tube runway image traces.

Another object of the invention is to provide apparatus that directs to the eyes of a pilot an improved form of runway image of collimated light.

Figure 1B:
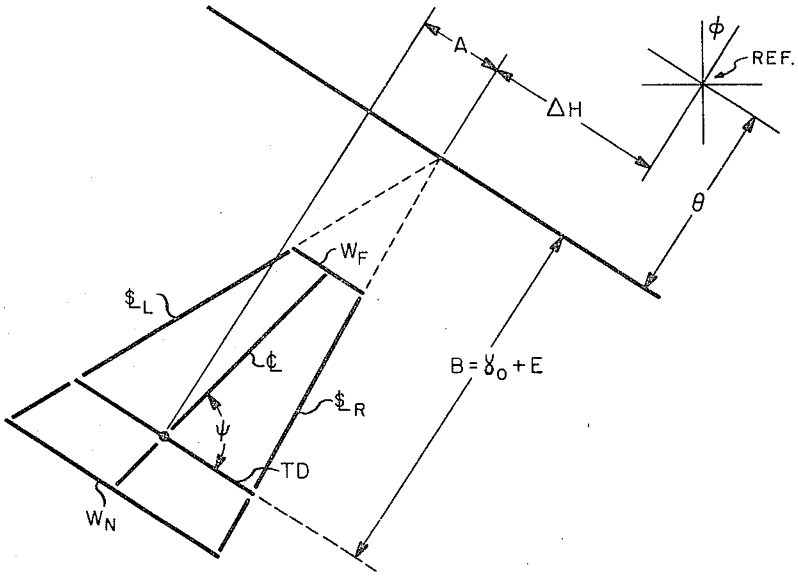
Figure 2A:
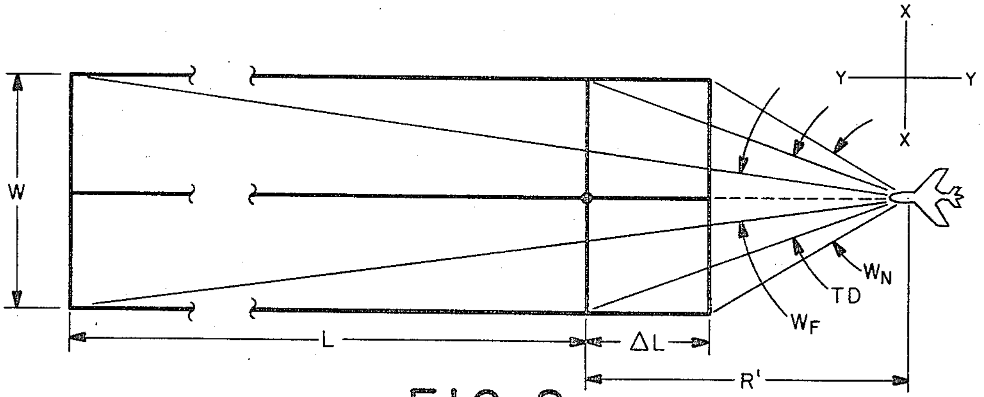
Figure 2B:
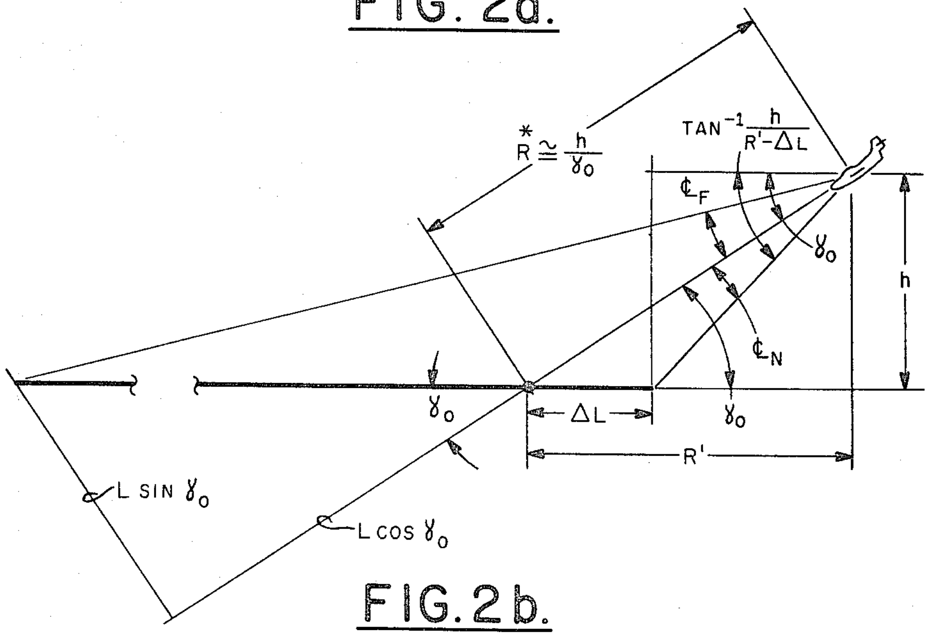
Figure 3:
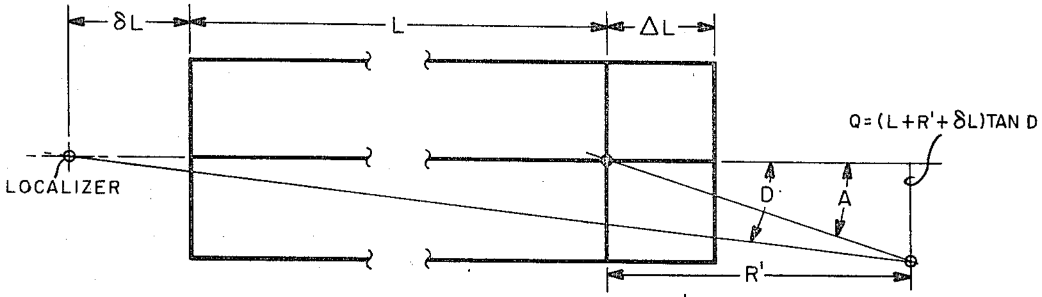
Figure 4A:
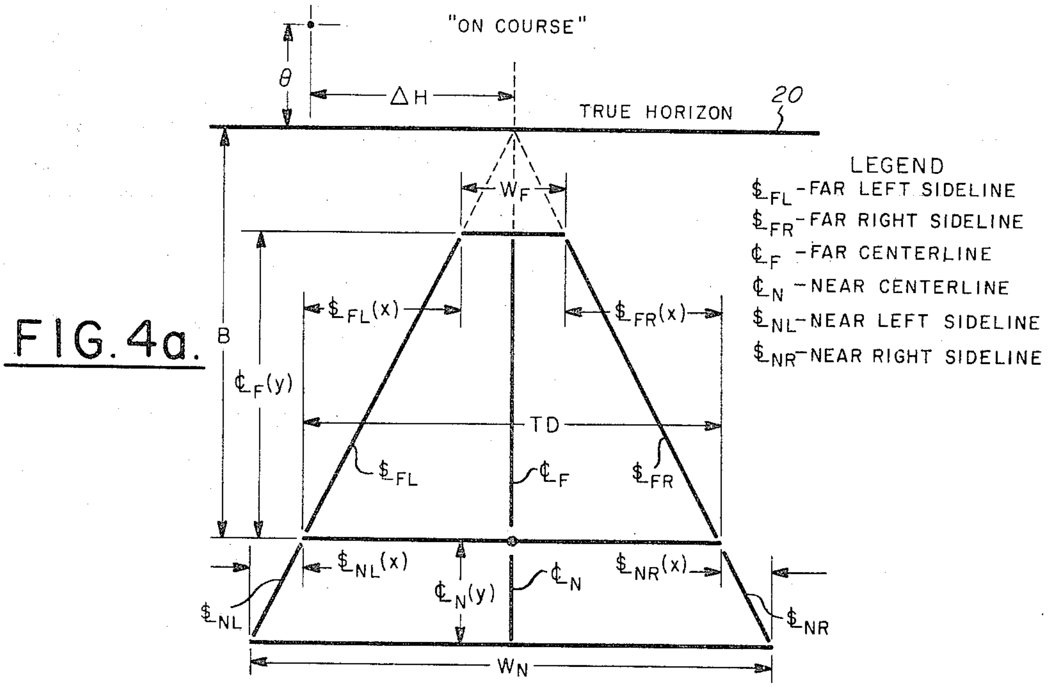
Figure 4B:
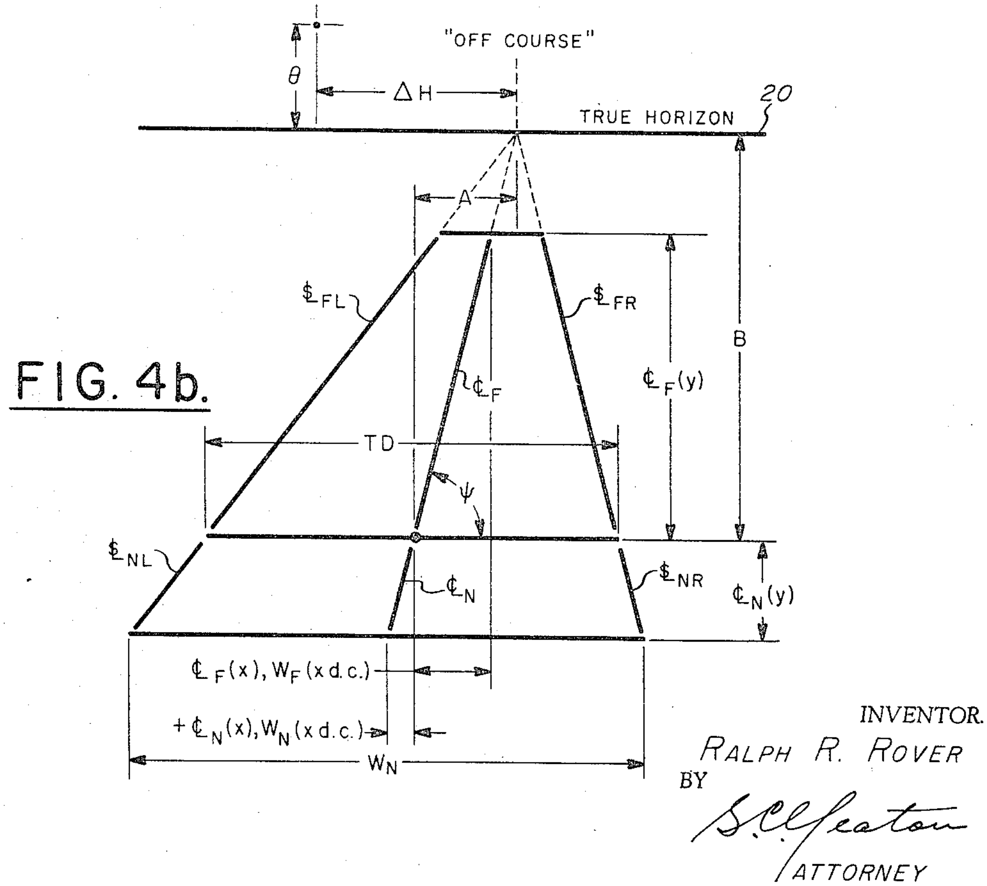
Figure 5A:
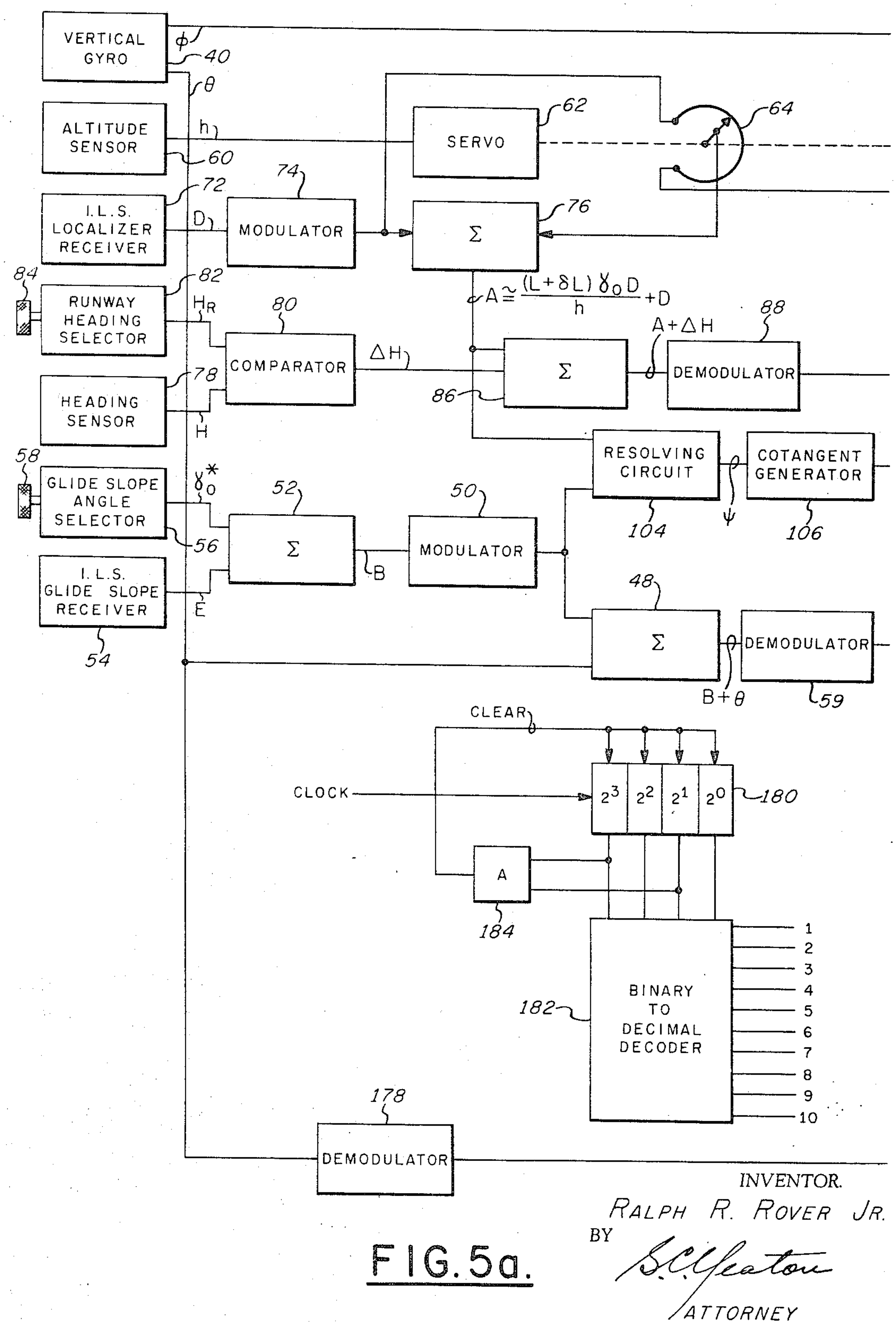
Figure 5B:
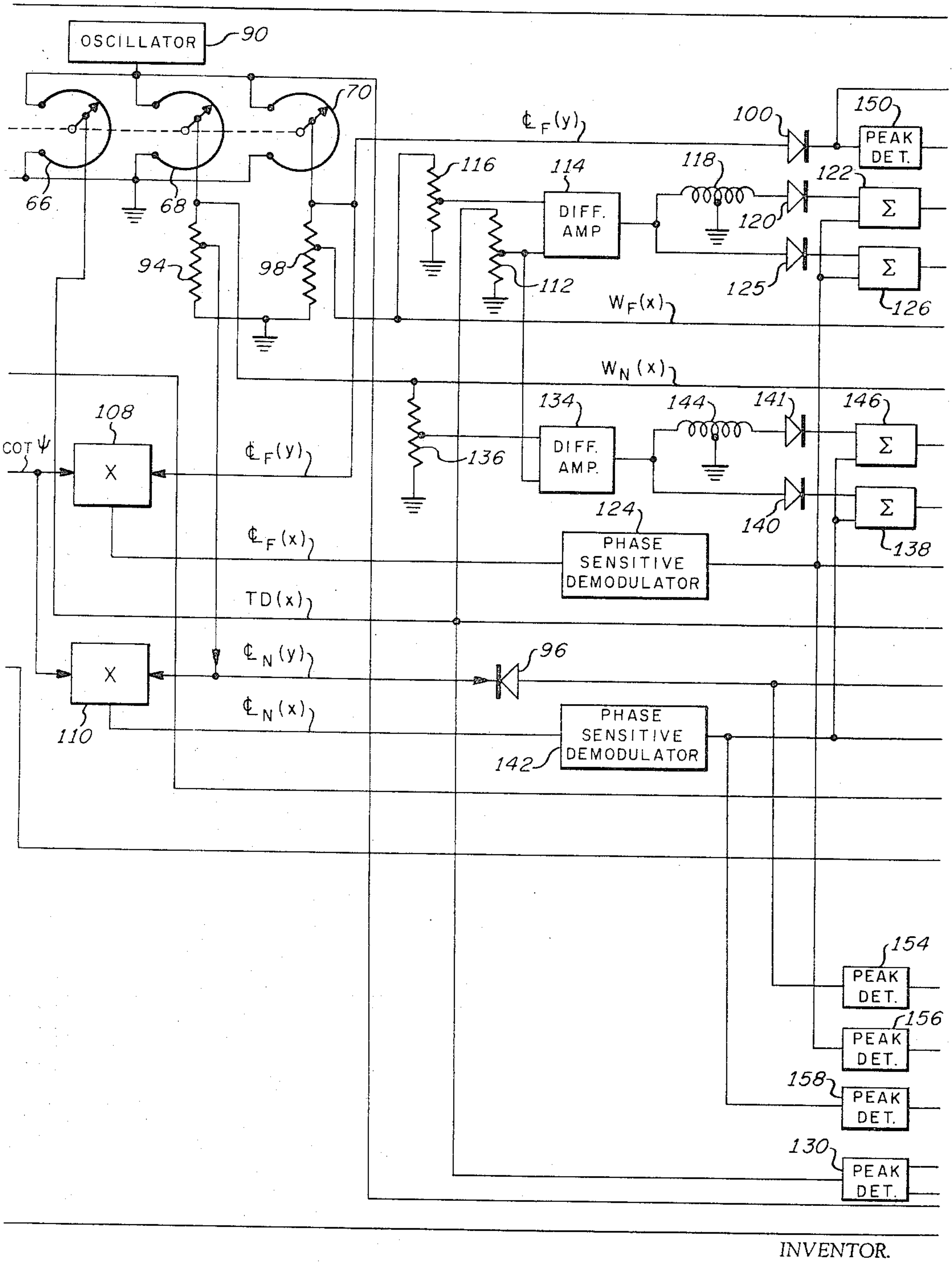
Figure 5C:
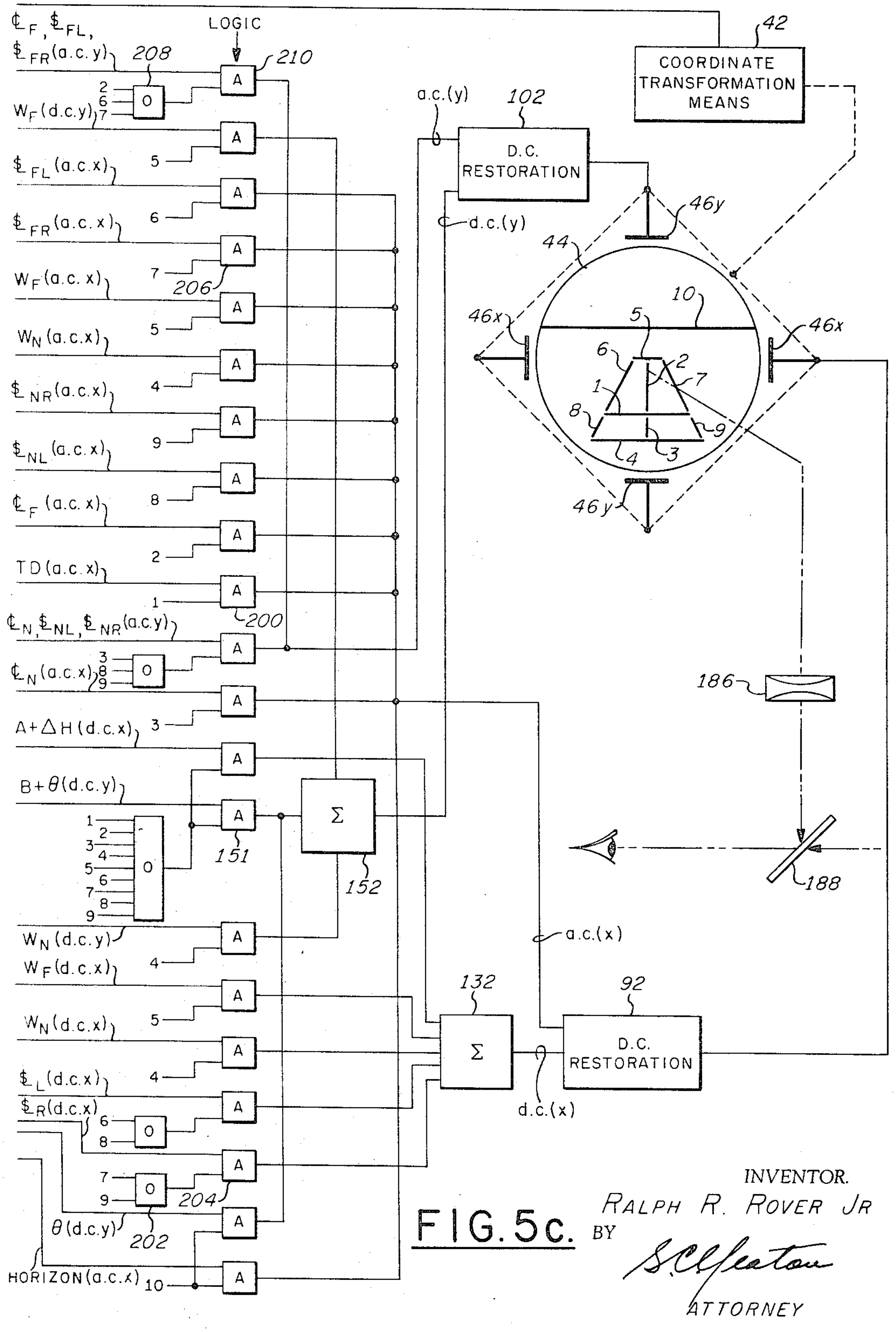

The invention will be described with reference to the figures wherein:

FIGS. 1*a* and 1*b* are diagrams useful in showing the derivation of signals employed in apparatus embodying the invention, FIGS. 2*a* and 2*b* are plan and profile views showing an aircraft during a landing maneuver, FIG. 3 is a diagram showing how a certain described quantity may be computed from data received from a localizer radio link to the ground, FIGS. 4*a* and 4*b* are diagrams showing the appearance of the real world runway when the craft is respectively on and off course during a landing maneuver, and FIGS. 5*a*, 5*b* and 5*c* are a schematic block diagram of a system embodying the invention.

In FIGS. 1*a* and 1*b*, values and traces are shown as provided respectively by prior art runway image producing apparatus and apparatus embodying the invention. As taught by copending application S.N. 164,769, a horizon line 20 is displaced with respect to a reference location on a cathode ray tube, hereafter sometimes called a C.R.T., in proportion to craft pitch attitude $\theta$, the runway image 22 itself being positioned below the horizone line 20 in proportion to a quantity B equal to the sum of a signal $\gamma_0$ representing the angle that the craft landing glide makes with respect to the earth and a signal E provided by the craft Instrument Landing System glide slope receiver. Displacement of the runway image parallel to the horizon line 20 is in proportion to the sum of a signal $\Delta H$ representing the craft heading with respect to the runway heading and a signal A derived (as will be shown later) from a signal D provided by the craft Instrument Landing System localizer receiver. Craft roll $\phi$ causes all traces on the C.R.T. to rotate proportionately about the axis of the tube. From FIG. 1*a*, it can be seen that a runway threshold line 24 and a runway center line 26' together form an inverted T as taught by copending application S.N. 164,769. The threshold line 24 together with the bounding lines 28', 30' and 32' form a four-sided runway image somewhat as disclosed by copending application S.N. 240,836. The manner of computing the angle $\psi$ that the runway center line makes with respect to the threshold line 24 is taught by copending application S.N. 164,769.

FIG. 1*b* shows the image of FIG. 1*a* as improved by apparatus embodying the invention, i.e. the runway center line ℄ and side lines $\$_L$ and $\$_R$ are extended to meet with a line $W_N$ representing the near end of the runway, the threshold line TD being the same here as in the case of line 24 of FIG. 1*a*, the far end of the runway being designated $W_F$. Collimating the light from the cathode ray tube images and directing same to the eyes of a pilot so as to provide a runway image overlay constitutes the invention taught by copending application S.N. 164,769.

In making the instant invention, a fundamental supposition has been made, viz. that the TD, $W_N$ and $W_F$ image lines always appear parallel to the horizon line 20, such being the case so long as the craft is not appreciably displaced sideways with respect to the real world runway center line (i.e. when localizer signal D is relatively small) which fact is usually the case. By making this supposition, the invention departs from the four-sided image techniques of copending application S.N. 240,836, and in doing so greatly simplifies the apparatus needed for image generation, bringing into play the aforementioned possibility of using a single circuit component for computation of two separate and distinct equations.

From FIGS. 2*a* and 2*b*, the runway image lines depicted on FIG. 1*b* are shown subtending various correspondingly designated angles, the ordinates X—X and Y—Y being representative of the C.R.T. beam deflection circuits employed for generation of the image lines. Following is a set of equations directly derivable from FIGS. 2*a* and 2*b*, such equations being useful in determining the lengths of the various lines to be inscribed for generating the runway image of the invention, and being all set forth under the assumption that the $W_F$, $W_N$ and TD lines are parallel, i.e. that the Y ordinate components for the side lines $\$_L$ and $\$_R$ and the center line ℄ are identical. That this assumption is valid may be appreciated when one considers a normal IFR approach of an aircraft following an ILS beam at a point about three miles from the end of the runway. The localizer beam angle is approximately ±2.5° and the glide sope beam angle is approximately ±.4°. Therefore, at this point the maximum lateral and vertical displacement of the craft, with the ILS displacement meter reading full scale, would only be about 700 feet and about 112 feet, respectively. Thus, during normal instrument approach on the ILS beam, the real runway will always appear substantially directly ahead, under which conditions horizontal lines on the earth perpendicular to the runway center line and hence the aircraft sight line will appear to be substantially parallel. Furthermore, in connection with the following equations it should be noted that the angle that the standard ILS glide slope makes with respect to the ground is very small, i.e. approximately 2½°, so that the normal flight path angle $\gamma_0$ of an aircraft following the glide slope is likewise 2½°. Therefore, by inspection of FIG. 2*b*, wherein all vertical angles are greatly enlarged for clarity, it will be appreciated that in actual practice all vertical angles involved are very small, given the basic angle $\gamma_0$ as 2½°; i.e. all angles involved are considerably less than 5°, and hence the trigonometric functions of such small angles are insignificant from a practical standpoint. In examining these equations, it should be borne in mind that (X) and (Y), and the subscripts F, N, L and R represent (when the image is roll stabilized) respectively "C.R.T. X-axis beam deflection," "Y-axis beam deflection," "FAR," "NEAR," "LEFT," and "RIGHT":

$$R^*=\frac{h}{\sin\gamma_0}\cong R^1\cong\frac{h}{\gamma_0} \qquad (1)$$

$$W_N(X)=2\tan^{-1}\frac{\frac{1}{2}W}{R^1-\Delta L}\cong\frac{W}{\frac{h}{\gamma_0}-\Delta L} \qquad (2)$$

$$TD(X)=2\tan^{-1}\frac{\frac{1}{2}W}{R^1}\cong\frac{W\gamma_0}{h} \qquad (3)$$

$$W_F(X)=2\tan^{-1}\frac{\frac{1}{2}W}{L+R^1}\cong\frac{W}{L+\frac{h}{\gamma_0}} \qquad (4)$$

$$\text{℄}_N(Y)=\tan^{-1}\frac{h}{R^1-\Delta L}-\gamma_0\cong\frac{\Delta L\gamma_0}{\frac{h}{\gamma_0}-\Delta L} \qquad (5)$$

$$\text{℄}_F(Y)=\tan^{-1}\frac{L\sin\gamma_0}{L\cos\gamma_0+R^*}\cong\frac{L\gamma_0}{L+\frac{h}{\gamma_0}} \qquad (6)$$

where W represents runway width, R* represents craft range to the aim point, L represents runway length and ΔL represents the distance that the Instrument Landing System glide slope transmitter is displaced back from the front end $W_N$ of the runway. On examining Equations 2 through 6 (Equation 1 merely defines range R* in terms of altitude), which equations are for prescribing respective runway lines on the CRT, it is seen that Equations 2 and 5 for the front or near end line $W_N$ and the center line $\text{℄}_N$ respectively have identical denominators, their respective numerators, however, being different. Similarly, Equations 4 and 6 for the runway far end line $W_F$ and the center line $\text{℄}_F$ are identical except for their numerators. Now, by making the reasonable assumptions of a standard runway width (200 ft.), of a standard runway length (10,000 ft.), of a standard glide slope angle (2½ degrees), and a standard distance ΔL (1,000 ft.), Equation 2 becomes different from Equation 5 by a mere constant; similarly, Equation 4 becomes different from Equation 6 by a mere constant. Therefore, for solving each of the two related equations, but a single potentiometer, suitably wound with the constants mentioned and having its wiper driven in accordance with altitude, is required to produce the two related signals used in the generation of their corresponding runway image lines. Also, since Equation 3 has only one variable in it, one potentiometer may for example be employed for generation of a signal for tracing the threshold line TD.

As aforesaid, a signal A representing the "Cross-Course" displacement sideways of a craft from the runway aim point may be derived from the signal D. See FIG. 3 and its related derivation, where δL represents the distance the localizer transmitter is located behind the far end of the runway, i.e. line $W_F$. Realizing that δL, like ΔL, is usually a constant of about 1,000 ft., a single potentiometer for example may again be used in the computation of the signal A, i.e. by exciting a suitably wound or loaded potentiometer with the signal D and varying its wiper location in accordance with altitude (or range) a signal results which when summed with the signal D provides the signal A.

From FIGS. 4*a* and 4*b*, which show respectively the "On Course" and "Off Course" appearances of the real world runway image during a landing maneuver, the following equations may be set forth:

$$\text{℄}_F(X)=\text{℄}_F(Y)\cot\psi \qquad (7)$$

$$\text{℄}_N(X)=\text{℄}_N(Y)\cot\psi \qquad (8)$$

$$\$_{FL}(X)=\frac{TD-W_F(X)}{2}+\text{℄}_F(X) \qquad (9)$$

$$\$_{FR}(X)=-\frac{TD-W_F(X)}{2}+\text{℄}_F(X) \qquad (10)$$

$$\$_{NL}(X)=-\frac{W_N(X)-TD}{2}+\text{℄}_N(X) \qquad (11)$$

$$\$_{NR}(X)=+\frac{W_N(X)-TD}{2}+\text{℄}_N(X) \qquad (12)$$

$$\$_{FL}(Y)=\$_{FR}(Y)=\text{℄}_F(Y) \qquad (13)$$

$$\$_{NL}(Y)=\$_{NR}(Y)=\text{℄}_N(Y) \qquad (14)$$

Note should be made that so long as the craft is "On Course" the X-ordinate components of the center lines, $\text{℄}_N$(X) and $\text{℄}_F$(X), for all side line equations vanish. That equations 13 and 14 are true statements of conditions depends from the fact that the invention presupposes that the threshold line TD, runway far end line $W_F$, and runway near end line $W_N$ all always remain parallel to the horizon line 20 as explained above.

Before describing an arrangement of circuit components for mechanizing the above equations of the instant invention, the general way in which the improved form of runway image is inscribed on the face of a cathode ray tube will be set forth:

First, the aim point of the image is located by means of D.C. biasing potentials $B+\theta$ (to the C.R.T. Y-axis deflection circuit) and $A+\Delta H$ (to the C.R.T. X-axis deflection circuit). Then, by applying an A.C. signal to the X-axis deflection circuit of the C.R.T., such A.C. signal having a peak-to-peak amplitude representative of $$\frac{W\gamma_0}{h}$$

(Equation 3 above), the runway TD line will be suitably inscribed on the C.R.T. face. With $B+\theta$ and $A+\Delta H$ bias voltages still applied respectively to the Y-axis and X-axis deflection circuits of the C.R.T., the A.C. signal $$\frac{W\gamma_0}{h}$$

is removed and instead a rectified A.C. as defined by Equation 6 above is applied to the Y-axis deflection circuit of the C.R.T. For "Off Course" situations, a rectified A.C. signal ℄$_F(X)$ as defined by Equation 7 is simultaneously applied to the C.R.T. X-axis deflection circuit while the signal representative of Equation 6 is applied to the C.R.T. Y-axis deflection circuit. The ℄$_N$ line is inscribed in the same manner as the line ℄$_F$, only using a rectified A.C. signal having a magnitude as defined by Equation 5.

As for locating quiescent points for the other runway image lines, this is done principally by detecting the peak amplitudes of already available signals. For example, in inscribing the side line $\$_{FL}$, the signal TD has its peak detected to produce a D.C. potential which is added to the D.C. bias signal $A+\Delta H$ to locate a new quiescent point. Now, simultaneously two half wave rectified signals $\$_{FL}(X)$ and $\$_{FL}(Y)$ are applied to the X-axis and Y-axis cathode ray tube beam deflection circuits, whereby by well-known Lissajous techniques the skewed side line $\$_{FL}$ results. Other lines and quiescent points are provided similarly.

Referring now to FIGS. *5a*, *5b* and *5c*, a vertical gyroscope 40, providing A.C. signals $\phi$ and $\theta$ representing respectively craft roll and pitch attitudes with respect to a reference attitude, applies its signal $\phi$ to a co-ordinate transformation means 42 which operates to rotate images appearing on the face of a cathode ray tube 44 about the axis of the tube. Here, for ease of understanding the C.R.T. axis and the craft longitudinal axis are assumed aligned. Furthermore, it will be understood that the horizontal and vertical deflection means defined the directions of the various traces produced thereby correspond generally with the "On-Course" direction of the instrument landing flight path and "Cross-Course" direction respectively. The co-ordinate transformer 42 may take a variety of forms and to facilitate understanding the operation of apparatus embodying the invention is shown as a servomotor mechanically linked to rotate electrostatic deflection plates 46X and 46Y of the cathode ray tube 44 about its axis. While electrostatic deflection plates are shown, magnetic deflection techniques may, of course, also be employed. The A.C. signal $\theta$ from the vertical gyroscope 40 is applied to a summing element 48 together with an A.C. signal B provided by a modulator 50. To provide the signal B for application to the summing element 48, the modulator 50 receives a D.C. output signal B from a summing element 52, which summing element sums a D.C. output signal E from an Instrument Landing System glide slope receiver 54 and a D.C. signal $\gamma_0^*$ provided by a glide slope angle selector 56. The signal $\gamma_0^*$ represents the angle that the radio defined glide slope makes with respect to the earth, and the signal E represents the angular displacement of the craft from that defined course. The glide slope angle selector may be a potentiometer excited by a D.C. voltage, being settable by means of a knob 58. The A.C. output signal from the summing element 48 is converted by a demodulator 59 back to a D.C. signal $B+\theta$ for locating the aim point of the runway image along the Y-axis of the cathode ray tube 44.

An altitude sensor 60, providing an altitude signal $h$, applies such signal to a servo 62 for driving the wipers of four potentiometers 64, 66, 68 and 70 in proportion thereto. The servo 62, it is understood, has suitable damping and is provided with displacement feedback for cancelling the signal $h$. An Instrument Landing System localizer receiver 72, providing a D.C. signal D representing the craft angular displacement with respect to a real world runway center line taken generally at the localizer transmitter location (see FIG. 3), applies such signal to a modulator 74 wherein it is converted to an A.C. signal for excitation of the potentiometer 64. With the potentiometer 64 wound (or suitably loaded) in accordance with the numerator of the first term of the equation derived in conjunction with FIG. 3, the signal appearing on the wiper of the potentiometer 64 will be an A.C. signal $$\frac{(L+\delta L)\gamma_0 D}{h}$$

Application of this last-named signal to a summing element 76, together with the A.C. signal D from the modulator 74, provides a resultant A.C. signal A.

A heading sensor 78, which may be a gyromagnetic compass system, applies its A.C. output signal H to a comparison device 80 connected to receive an A.C. output signal $H_R$ from a runway heading selector 82. The runway heading selector 82 is adapted to be set by means of a knob 84 to provide an A.C. output signal representing the heading of the real world runway onto which it is desired to land. The runway heading selector 82 may take the form of a simple synchro transmitter. The comparison device 80 provides an A.C. signal $\Delta H$ representing the instantaneous heading of the craft with respect to the heading of the runway and applies such signal $\Delta H$ to a summing element 86. The summing element 86 receives also the A.C. signal A and applies its own A.C. output signal $A+\Delta H$ to a demodulator 88 which converts such signal to a D.C. signal for application to the cathode ray tube 44 X-axis deflection circuit, whereby the aim point of the C.R.T. runway image is located along the tube X-axis.

The potentiometer 66 is wound (or suitably loaded) to provide the numerator of Equation 3 above, whereby when an oscillator 90 excites the potentiometer 66 an A.C. signal appears on the wiper of the potentiometer 66 which is of a magnitude proportional to the quantity TD. The A.C. signal TD is applied through a logic circuit (to be described later) to the X-axis deflection circuit of the cathode ray tube 44 via a D.C. restoration element 92, which element serves to vary the D.C. reference for A.C. signals applied to it in accordance with output signals from a D.C. summing element 132.

The potentiometer 68 is excited by the oscillator 90 and is wound (or suitably loaded) to accommodate Equation 2 mentioned above. Therefore, the signal appearing on the wiper of the potentiometer 68 is representative of the signal $W_N(X)$ necessary for inscribing the line representing the near end of the runway on the cathode ray tube 44. The A.C. signal $W_N(X)$ appearing on the wiper of the potentiometer 68 is applied across a resistor 94, which resistor is suitably tapped to provide the signal ℄$_N(Y)$ as defined by Equation 5 above. The signal $W_N(X)$ is applied through the aforementioned logic circuit to the D.C. restorer 92, whereby a line representing the near end of the runway may be inscribed on the face of the cathode ray tube 44. The A.C. signal ℄$_N(Y)$ is applied to a diode 96 which operates to allow only the negative half cycle of the A.C. signal appearing across the resistor 94 to be applied through the logic circuit to a D.C. restoration element 102, and thence to the Y-axis deflection circuit of the cathode ray tube 44.

The potentiometer 70 is wound (or suitably loaded) to accommodate Equation 6 above, and is excited by the oscillator 90. The A.C. signal ℄$_F(Y)$ appearing on the wiper of the potentiometer 70 is developed across a resisor 98, and is representative of the Y-axis component of the far end of the runway center line as it appears on the face of the cathode ray tube 44. This signal ₵$_F$(Y) is applied through a diode 100, which diode is adapted to pass only the positive half cycle of its received A.C. signal, being then applied through the logic circuit to the Y-axis deflection circuit of the cathode ray tube via the D.C. restoration element 102. The resistor 98 is tapped to provide the signal $W_F(X)$ for generating a trace representing the far end of the runway, being applied through the logic circuit to the X-axis deflection circuit of the cathode ray tube 44 via the D.C. restoration element 92.

The A.C. signal A from the summing element 76 and the A.C. signal B from the modulator 50 are applied to a resolving circuit 104, which circuit may be like the circuit of FIG. 5 of copending application S.N. 164,769. The resolving circuit 104 produces a signal $\psi$ representing the angle that the real world runway center line appears skewed as a result of lateral displacement of the craft with respect to the localizer defined course. The signal $\psi$ is applied to a cotangent generator 106, e.g. a potentiometer wound to provide a cotangent function, which provides the output signal cot $\psi$. The signal cot $\psi$ is applied to two signal multiplying devices 108 and 110 which receive respectively the signal ₵$_F$(Y) from the potentiometer 70 and the signal ₵$_N$(Y) from the potentiometer 68. Therefore, the output signals from the two multiplying elements 108 and 110 are respectively the X-axis components of the runway center line as defined by Equations 7 and 8 above.

To compute side line Equation 9 above, the signal TD is applied across a resistor 112 which is so tapped that only one half the signal TD is applied to a difference amplifier 114. The signal $W_F(X)$ appearing on the tap of the resistor 98 is applied across a resistor 116 also tapped so that half of its applied signal is applied to the difference amplifier 114. The A.C. output signal $$\frac{TD-W_F(X)}{2}$$

appears across a grounded center-tapped inductor 118 and is rectified by a diode 120 before being applied to a summing element 122. The summing element 122 also receives the signal ₵$_F$(X) through a phase sensitive demodulator 124, which may for example be a chopping circuit adapted to pass only the positive half cycle of the A.C. signal ₵$_F$(X) provided by the multiplying element 108 when the craft is left $\psi=90°-e$ of the localizer defined course and the negative half cycle of the signal ₵$_F$(X) when the craft is right $\psi=90°+e$ of the localizer defined course. Therefore, the output signal \$$_{FL}$(A.C. $x$) appears at the output of the summing element 122 and is applied through the logic circuit to the D.C. restoration element 92 and thence to the X-axis deflection circuit of the cathode ray tube 44. The Y-axis component of the far left side line is, as above stated (Equation 13), the same as the Y-axis component of the far center line; therefore the signal appearing on the wiper of the potentiometer 70 is applied through the logic circuit to the D.C. restoration element 102 for application to the Y-axis deflection circuit of the cathode ray tube 44.

For inscribing the far right side line of the runway image on the face of the cathode ray tube 44, the inverse of the signal applied to the summing element 122 is taken off the opposite end of the inductor 118 and applied through a diode 125 to a summing element 126, such element also receiving the signal ₵$_F$(X) appearing at the output of the demodulator 124. Hence, the summing element 126 provides an output signal \$$_{FR}$(A.C. $x$) in accordance with Equation 10 above. This signal \$$_{FR}$(A.C. $x$) is applied through the logic circuit to the D.C. restoration element 92 for application to the X-axis deflection circuit of the cathode ray tube 44. To generate the Y-axis component of the far right side line of the runway image appearing on the C.R.T. face the signal appearing on the wiper of the potentiometer 70 is again applied to the Y-axis deflection circuit of the cathode ray tube 44 via the D.C. restoration element 102. Inscribing each of the far side lines of the runway image on the face of the cathode ray tube 44 is done by simultaneously exciting both the X-axis and Y-axis deflection circuits with in-phase components of rectified signals in the manner of well-known Lissajous techniques. To locate a quiescent point for the left side line, the signal TD is applied to a peak detector 130, which circuit provides a D.C. bias signal \$$_L$(D.C. $x$) which is applied through the D.C. summing element 132 to the D.C. restoration circuit 92. Similarly the peak detector 130 provides a D.C. signal \$$_R$(D.C. $x$) from the negative half cycle of the A.C. signal TD. Hence, both the X-axis, i.e. the left and right quiescent points on the face of the cathode ray tube 44, needed for generation of the two far side lines is provided, the quiescent Y-axis points here both being the same as that for the TD line, viz. $\theta+B$.

Like the far side lines of the C.R.T. runway image, the near side lines result from computing their definitive equations, to wit Equations 11 and 12 noted above. The A.C. signal $TD/2$ which had been applied to the difference amplifier 114 is applied also to a difference amplifier 134 together with an A.C. signal $W_N(X)/2$ taken off a tapped resistor 136, which amplifier has its output taken across a grounded center-tapped inductor 144. The difference amplifier 134 output signal $$\left(\frac{W_N(X)-TD}{2}\right)$$

is applied to a summing element 138 through a rectifier 140. The summing element 138 receives the signal ₵$_N$(X) from the multiplying element 110 through a phase sensitive demodulator 142 adapted to pass the negative half cycle of the A.C. signal ₵$_N$(X) when the craft is left $\psi=90°-e$ of the localizer defined course and the positive half cycle of the signal ₵$_N$(X) when the craft is right $\psi=90°+e$ of the localizer defined course. Therefore the summing element 138 provides the output signal \$$_{NL}$(A.C. $x$) in accordance with Equation 11 mentioned above. As for the Y-axis component of the cathode ray tube trace representing the near left side line of the runway image, this is provided in accordance with Equation 14 above by application of the signal taken through the diode 96 to the D.C. restoration element 102, from whence it is applied to the Y-axis deflection circuit of the cathode ray tube 44.

Inscribing the near right side line of the C.R.T. runway image is provided by taking the difference amplifier 134 output signal across the opposite end of the output inductor 144 and applying it through a diode 141 to a summing element 146 adapted to receive also the signal ₵$_N$(X) from the demodulator 142. Hence, the summing element 146 provides an output signal \$$_{NR}$(A.C. $x$) in accordance with Equation 12 above, which signal is appled through the logic circuit to the X-axis deflection circuit of the cathode ray tube 44. As with generation of the near left side line trace, the signal passing through the diode 96 is applied to Y-axis deflection circuit for the C.R.T. in accord with Equation 14. above. The quiescent operating points for both near side lines are the same as was provided for the far side lines respectively, and it is for this reason that the output signals from the peak detecting circuit 130 are noted as being neither for near or far line generation. Here, as with the far side lines, rectified in-phase A.C. signals are simultaneously applied to both deflection circuits of the cathode ray tube 44, resulting in the desired skewed near side line traces by Lissajous techniques.

To locate the C.R.T. Y-axis quiescent point for the line representing the far end of the real world runway as provided by the signal $W_F$(A.C. $x$), the pulstating D.C. signal appearing at the output of the rectifier 100 has its peak detected by a peak detector 150 to provide a D.C. bias signal $W_F$(D.C. $y$), which signal is applied through the logic circuit to the D.C. summing element 152 for application to the Y-axis D.C. restoration circuit 102. Similarly the near end of the runway as defined by the A.C. signal $W_N(X)$ appearing on the wiper of the potentiometer 68 has its quiescent point along the Y-axis of the cathode day tube 44 located by detecting the peak of the pulsating D.C. signal applied through the rectifier 96 by means of a peak detecting element 154. The peak detecting element 154 has its output signal $W_N$(D.C. $y$) applied through the logic circuit to the D.C. summing element 152 for application to the Y-axis D.C. restoration circuit 102.

Location along the X-axis of the cathode ray tube of the quiescent point for the trace representing the far end of the real world runway is provided by detecting the peak, by means of an element 156, of the pulsating D.C. signal appearing at the output of the demodulator circuit 124 and applying it as a D.C. reference signal $W_F$(D.C. $x$) to the D.C. summing element 132 for application to the C.R.T. X-axis D.C. restoration circuit 92. Likewise location of the quiescent point for the line representing the near end of the runway as defined by the A.C. signal $W_N(X)$ appearing on the wiper of the potentiometer 68 is provided by detecting the peak of the pulsating D.C. signal appearing at the output of the demodulator 142, whereupon a D.C. reference signal $W_N$(D.C. $x$) is applied from an element 158 through the logic circiut to the D.C. summing element 132 for application to the C.R.T. X-axis D.C. restoration circuit 92.

The signal $\theta$ is applied to a demodulator 178 and applied as a D.C. bias signal through the logic circuit to the Y-axis D.C. restoration circuit 102 via the D.C. summing element 152, whereby a quiescent point for generating a horizon-representative trace on the C.R.T. face is provided. The A.C. component for this trace is derived directly from the oscillator 90.

As has been seen so far, various combinations of D.C. and A.C. signal components must be applied to the C.R.T. deflection circuits for inscribing the desired traces of the runway image on the face of the cathode ray tube 44, whereby the tube may be time-shared for generation of each of those traces. That is, by suitably first applying D.C. and A.C. signal components to the C.R.T. deflection circuits the threshold line TD may be inscribed; then by applying A.C. and D.C. signal components to the C.R.T. deflection circuits for inscribing the far center line, that line may be provided; then by applying A.C. and D.C. signal components to the deflection circuits for inscribing the near center line, that line too may be provided; etc. The face of the cathode ray tube 44 is shown in FIG. 5 with an image comprising ten distinct numbered lines (disjoined intentionally for purposes of clarity), which numbers indicate the order in which the cathode ray tube deflection circuits are time-shared for respective line generation. To provide a ten-step time-sharing operation, a four-stage register 180 receives a clock pulse and applies its binary output to a binary-to-decimal decoder 182 having ten output leads which are successively excited. When the register 180 stores the binary equivalent of decimal 10, i.e. a $2^3$ and $2^1$, and AND gate circuit 184 applies a CLEAR pulse to the register 180, whereby the decoder output leads 1–10 are again successively excited as a result of the clock pulses. The logic circuit comprises suitably arranged OR and AND gate circuits having respective input leads designated by the numerals 1–10 to indicate the decoder 182 output leads to which they are respectively connected.

The light from the scene which appears on the face of the cathode ray tube 44 is shown being collimated by a lens 186 and directed to the eyes of a pilot via a semi-transparent combining glass 188 in accordance with the teaching of copending application Ser. No. 164,769.

To show the operation of the apparatus of FIG 5, a couple of the C.R.T. traces will be specifically developed step-by-step, viz. trace 1 representing the runway threshold TD and trace 7 representing the far right runway side line $\$_{FR}$.

Trace 1: With the decoder 182 lead 1 excited, the D.C. summing element 152 receives (through a logic circuit element 151) only the D.C. signal $B+\theta$ and applies it to the D.C. restoration element 102 (which receives at this time no A.C. signal) for application to the Y-axis deflection circuit of the C.R.T.; simultaneously with application of the D.C. signal $B+\theta$ to the Y-axis deflection circuit, an AND gate 200 opens in response to the decoder output signal on its lead 1, whereupon the A.C. signal TD is applied to the X-axis D.C. restoration circuit 92 for application to the C.R.T. X-axis deflection circuit. Applied simultaneously with the A.C. signal TD to the D.C. restoration circuit 92 is a D.C. signal $A+\Delta H$ which is applied, like the D.C. signal $B+\theta$ through a logic circuit element in response to excitation of the decoder 182 output lead 1, to the D.C. summing element 132. Therefore, the X-axis D.C. signal component serves to shift left and right on the C.R.T. face the reference point used for generation of the threshold line TD.

Trace 7: An OR gate 202 applies a signal to an AND gate 204 for application of a D.C. signal $\$_R$ (D.C. $x$) to the summing element 132. Therefore the X-axis D.C. reference point is determined by the D.C. signal $\$_R$ (D.C. $x$) and $A+\Delta H$, which latter signal is applied to the summing element 132 when the decoder 182 has its output lead 7 excited. Simultaneously with application of the signal $\$_R$(D.C. $x$)$+A+\Delta H$ to the D.C. restoration element 92, a pulsating D.C. signal $\$_{FR}$(A.C. $x$) is applied thereto through an AND circuit 206. Further at this time, an OR circuit 208 applies a signal to open an AND circuit 210 whereby the pulsating D.C. signal $\$_{FR}$ (A.C. $y$) is applied to the Y-axis D.C. restoration element 102, which element 102 receives the signal $B+\theta$ via the D.C. summing element 152. Hence, by means of the above-mentioned Lissajous principle the far right runway side line trace is provided.

Obviously many modifications within the scope of the above-described invention are possible, e.g. the order of generating the runway image lines may be varied, or, if preferred, instead of rectifying trace producing signals, such signals may be left as unaffected sine wave signals with their respective appropriate half cycle traces being blanked by blanking circuits associated with the cathode ray tube 44.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Aircraft landing aid apparatus for producing an image of a landing runway on the face of a cathode ray tube, said image comprising linear elements each having dimensions and orientations substantially colinear with corresponding elements of the actual runway as they would appear from an aircraft approaching said runway along a prescribed flight path, said apparatus comprising:

(a) a cathode ray tube having vertical and horizontal beam deflection means for producing traces on the face thereof having vertical and horizontal components corresponding respectively to the "On-Course" and "Cross-Course" directions of said prescribed flight path, (b) means for generating a first plurality of alternating current signals having relative amplitudes proportional to apparent width elements of said runway at predetermined points along the length thereof, (c) means for generating a second plurality of alternating current signals having relative amplitudes proportional to the apparent length elements of said runway between said width elements, (d) means supplying said first plurality of signals to said horizontal deflection means for producing images of said runway width elements and means supplying said second plurality of signals to said vertical deflection means for producing images of the runway center line elements, and (e) peak detector means responsive to said second plurality of signals and coupled with said vertical deflection means for controlling the relative vertical positions of said runway width image elements along said runway center line.

2. The image generating apparatus as set forth in claim 1 further including (a) means responsive to said first plurality of signals for providing a third plurality of signals proportional to the difference in the peak amplitudes of predetermined ones of said first signals, and (b) means simultaneously supplying said second and third pluralities of signals to said vertical and horizontal deflection means respectively for producing images of the runway side line elements.

3. The image generating apparatus as set forth in claim 2 wherein one of said runway width elements corresponds to the intersection of said prescribed flight path with said runway, said apparatus further including means responsive to "Cross-Course" displacement of said aircraft from said prescribed path for providing a first bias signal proportional to such displacement, means responsive to said second plurality of signals and to said first bias signal for supplying a plurality of second bias signals proportional to a function of said craft displacement, means responsive to said second bias signals for producing a plurality of third bias signals proportional to the peak amplitude of said second bias signals, and means for supplying all of said bias signals to said horizontal deflection means in timed relation with said first and second plurality of signals whereby to maintain said runway image elements substantially colinear with said apparent runway elements should said craft depart laterally from said prescribed flight path.

4. The image generating apparatus as set forth in claim 1 wherein the relative amplitudes of all of said signals are a function of the angle that the prescribed flight path makes with the horizontal and further including means for simultaneously varying the amplitude of all of said signals in accordance with the altitude of said aircraft in a sense to increase the size of said images as the craft approaches said runway.

References Cited

UNITED STATES PATENTS

| | | | |
|---|---|---|---|
| 2,309,314 | 1/1943 | Harshaw | 343—108 |
| 2,419,970 | 5/1947 | Roe et al. | 343—117.1 |
| 2,426,184 | 8/1947 | Deloraine et al. | |
| 2,539,405 | 1/1951 | Deloraine et al. | |
| 2,643,374 | 6/1953 | Bartow. | |
| 2,644,941 | 7/1953 | Kellogg | 343—108 |
| 3,005,185 | 10/1961 | Cumming et al. | |
| 3,237,193 | 2/1966 | Curry et al. | 343—108 |
| 3,242,493 | 3/1966 | Westerback | 343—108 |

RODNEY D. BENNETT, *Primary Examiner.*

CHESTER L. JUSTUS, *Examiner.*

B. L. RIBANDO, *Assistant Examiner.*